US006334784B1

(12) United States Patent
Howard

(10) Patent No.: US 6,334,784 B1
(45) Date of Patent: Jan. 1, 2002

(54) Z-AXIS PRESSURE MOUNT CONNECTOR FIXTURE

(75) Inventor: William E. Howard, Richmond, VT (US)

(73) Assignee: Teradyne, Inc., Boston, MA (US)

( * ) Notice: Subject to any disclaimer, the term of this patent is extended or adjusted under 35 U.S.C. 154(b) by 0 days.

(21) Appl. No.: 09/633,491

(22) Filed: Aug. 7, 2000

(51) Int. Cl.[7] .............................................. H01R 13/15
(52) U.S. Cl. ...................................................... 439/260
(58) Field of Search ................................ 439/260, 267

(56) References Cited

U.S. PATENT DOCUMENTS 5,152,695 A    10/1992   Grabbe et al. ................. 439/71
5,228,861 A    7/1993    Grabbe ........................ 439/66
5,421,738 A  * 6/1995    Roberts ....................... 439/260
5,704,793 A    1/1998    Stokoe et al. ................. 439/62

* cited by examiner

Primary Examiner—Neil Abrams
Assistant Examiner—Phuong Dinh
(74) Attorney, Agent, or Firm—Legal Department

(57) ABSTRACT

An electro-optical connector is described that provides a separable electrical interface for connecting to a circuit board. The optical connection between the fiber and the connector are semi-permanent. Also described is an electro-optical system that transfers signals between two circuit board over an optical fiber where the separable interface within the system is electrical rather than optical. Further described is a fixture with pivoting actuation and retraction for connecting a z-axis pressure mount connector to a circuit board.

17 Claims, 14 Drawing Sheets

Z-AXIS PRESSURE MOUNT CONNECTOR FIXTURE

BACKGROUND OF THE INVENTION

Electrical connectors are used in many electronic systems. It is generally easier and more cost effective to manufacture a system on several printed circuit boards that are then joined together with electrical connectors. A traditional arrangement for joining several printed circuit boards is to have one printed circuit board serve as a backplane. Other printed circuit boards, called daughter boards, are connected through the backplane.

A traditional backplane is a printed circuit board with many connectors. Conducting traces in the printed circuit board connect to signal pins in the connectors so signals may be routed between the connectors. Daughter boards also contain connectors that are plugged into the connectors on the backplane. In this way, signals are routed among the daughter boards through the backplane. The daughter cards often plug into the backplane at a right angle. The connectors used for these applications contain a right angle bend and are often called "right angle connectors."

Connectors are also used in other configurations for interconnecting printed circuit boards, and even for connecting cables to printed circuit boards. Sometimes, one or more small printed circuit boards are connected to another larger printed circuit board. The larger printed circuit board is called a "mother board" and the printed circuit boards plugged into it are called daughter boards. Also, boards of the same size are sometimes aligned in parallel. Connectors used in these applications are sometimes called "stacking connectors" or "mezzanine connectors."

Regardless of the exact application, electrical connector designs have generally needed to mirror trends in the electronics industry. Electronic systems generally have gotten smaller and faster. They also handle much more data than systems built just a few years ago. These trends mean that electrical connectors must carry more and faster data signals in a smaller space without degrading the signal. Constraints imposed by the geometries of backplanes designed for certain applications however, reduce the options available for possible connector solutions.

For example, thick, large backplanes make some surface mount connectors impractical as the number of layers in the board hinders raising the board to a temperature necessary to solder the leads to the board. Press fit connectors require larger vias. As via diameters increase, the capacitance of the via also increases thus making an impedance match between the connector and the characteristic impedance of a transmission line on the backplane more difficult.

Connectors which make contact through pressure are sometimes referred to as "pressure mounted" or z-axis pressure mount connectors as the pressure applied to the connector to provide the desired contact is typically exerted in the z-axis direction. These pressure mount connectors provide the low electrical parasitics desired by current industry trends.

Connectors that join optical fibers to create a low loss, separable optical interface have been available and in use for a number of years.

These connectors use a variety of ferrule types, alignment schemes and latching mechanisms for joining solitary strands of single-mode and multi-mode optical fiber as well as a multiplicity of fibers in a ribbon form. An example of the second is typified by the "MT" style array ferrules. Each of these connectors join the fibers end to end using a variety of alignment techniques. For single fiber joints, an alignment ferrule generally surrounds and guides the fiber-ends together.

One application of optical connector technology is to provide an optical path for signals from board to board, or shelf to shelf within equipment chassis. This optical path is provided by passing optical fibers perpendicularly through a backplane, using so-called "pass through" optical connectors. A right angle mounting of connectors join the optical fibers from an optical module on the daughtercard to optical fibers in cables running out of a card rack. This right angle mounting relies upon a blind mating of the fibers and must conform to standard cable management conventions such as minimum bend radius that contribute to box volume requirements behind the backplane.

As the need for bandwidth capacity increases, "Optical Backplanes" usually in the form of laminated fiber matrices that overlay the backplane or that supplement the backplane are also being used. These optical backplanes, likewise have their fibers terminated to standard "pass through" optical connectors as previously described.

SUMMARY OF THE INVENTION

Current means for actuating z-axis pressure mount connectors typically involved bolting the circuit board, connector, and second circuit board together with screws and a form of reinforcing plate. Due to the nature of the fixturing used, these types of interfaces do not typically lend themselves to traditional, right angle daughtercard/backplane interfaces.

The current implementations of "optical backplane" or intra-box optical connections suffer as a result of the nature of the "pass through" optical interface onto the equipment backplane. A 90 degree turn by the optical fiber on the backplane is required. Current optical fiber technology requires the design to maintain a bend radius of greater than one inch to avoid optical loss and mechanical fatigue that can cause breakage. Fixtures that control the fiber bend radius are typically used. These fixtures gradually turn the fiber parallel to the backplane in order to plug to an overlay. Alternatively, fibers may be looped from one perpendicular "pass through" to another to effect slot to slot connectivity. Both of these options, however, consume considerable space behind the traditional electrical backplane while radius fixtures add additional cost to the system.

One solution described in the following disclosure provides a connector fixture for enabling a z-axis, pressure mount connection. The connector fixture includes a slot, an actuator, responsive to engagement by a circuit board inserted into the slot and a loading spring, responsive to rotation of the actuator, for compressing against a surface of a z-axis, pressure mount connector. With such an arrangement, a pressure mount connector can be used in a right angle mounting configuration.

Another solution described in the following disclosure provides a connector fixture for enabling an electro-optical connection. The connector fixture includes a slot, an actuator, responsive to engagement by a circuit board inserted into the slot, a channel for accepting an optical fiber and a loading spring, responsive to rotation of said actuator, for compressing against a surface of the electro-optical connector. With such an arrangement, a means for launching into an optical fiber positioned perpendicular to the circuit board is facilitated.

BRIEF DESCRIPTION OF THE DRAWINGS

The foregoing and other objects, features and advantages of the invention will be apparent from the following more particular description of an Electro-Optic Connector Module, as illustrated in the accompanying drawings in which like reference characters refer to the same parts throughout the different views. For clarity and ease of description, the drawings are not necessarily to scale, emphasis instead being placed upon illustrating the principles of the invention.

DETAILED DESCRIPTION OF THE INVENTION

Figure 1:
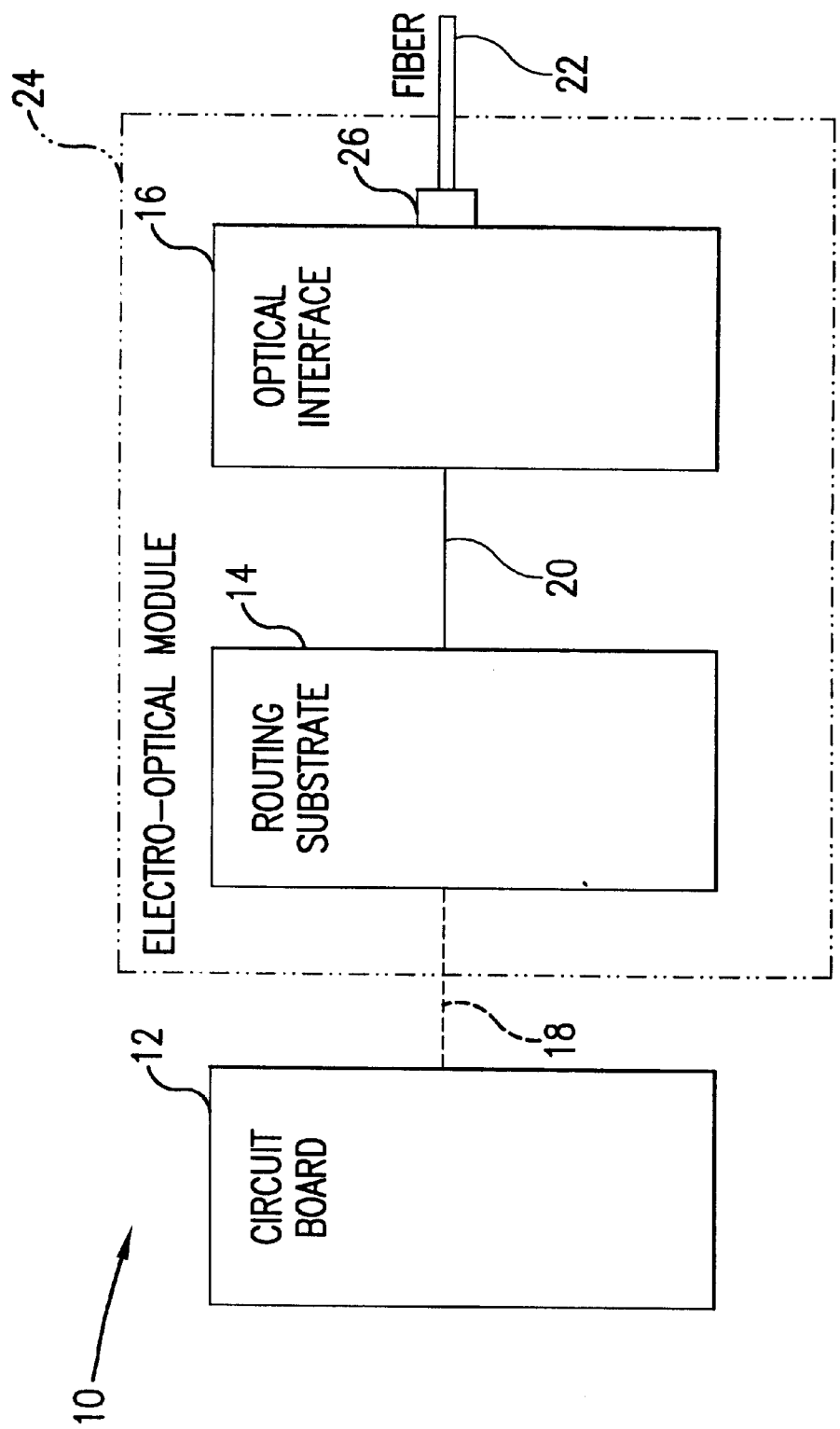
FIG. 1 is a block diagram of an electro-optical connection according to an embodiment of the invention.

The electro-optical connection 10 of FIG. 1 includes a circuit board 12, an electro-optical module 24 and an optical fiber or an array of optical fibers 22. The circuit board 12 and the electro-optical module 24 are connected through a separable, electrical connection 18. The electro-optical module 24 and the optical fiber 22 are connected through a semipermanent optical connection 26.

The electro-optical module 24 is shown to include a routing substrate 14 and an optical interface 16. The routing substrate is connected to the optical interface 16 through a fixed connection 20.

In the configuration of FIG. 1, an electrical signal passes from a signal trace (not shown) within the circuit board 12 through the separable, electrical interface 18 to the electro-optical module 24. Within the electro-optical module 24, the electrical signal is passed from the routing substrate 14, through the fixed connection 20 to an optical interface 16. The optical interface 16 converts the electrical signal to an optical signal which is transferred to the optical fiber 22 through the semi-permanent optical connection 26. The electro-optical connection system 10 also operates in reverse wherein an optical signal traveling through the optical fiber 22 to the optical interface 16 is converted to an electrical signal. The electrical signal passes through the fixed connection 20 to the routing substrate 14 and through the separable, electrical interface 18 to a signal trace on the circuit board 12.

Generally, in an electro-optical connection system, the separable interface in the system is a mating between two optical fiber ends. Here, however, the separable interface is provided by an electrical connection, thus avoiding the problems encountered with fiber to fiber connections such as alignment issues and dust contamination. The semi-permanent connection between the optical fiber and the electro-optical module can be provided in a controlled factory setting allowing for better alignment and, when done in a dust free environment, minimal risks of contamination. The semi-permanent nature of the connection is generally provided to enable future servicing and repairs to the connection and/or components.

Figure 2:
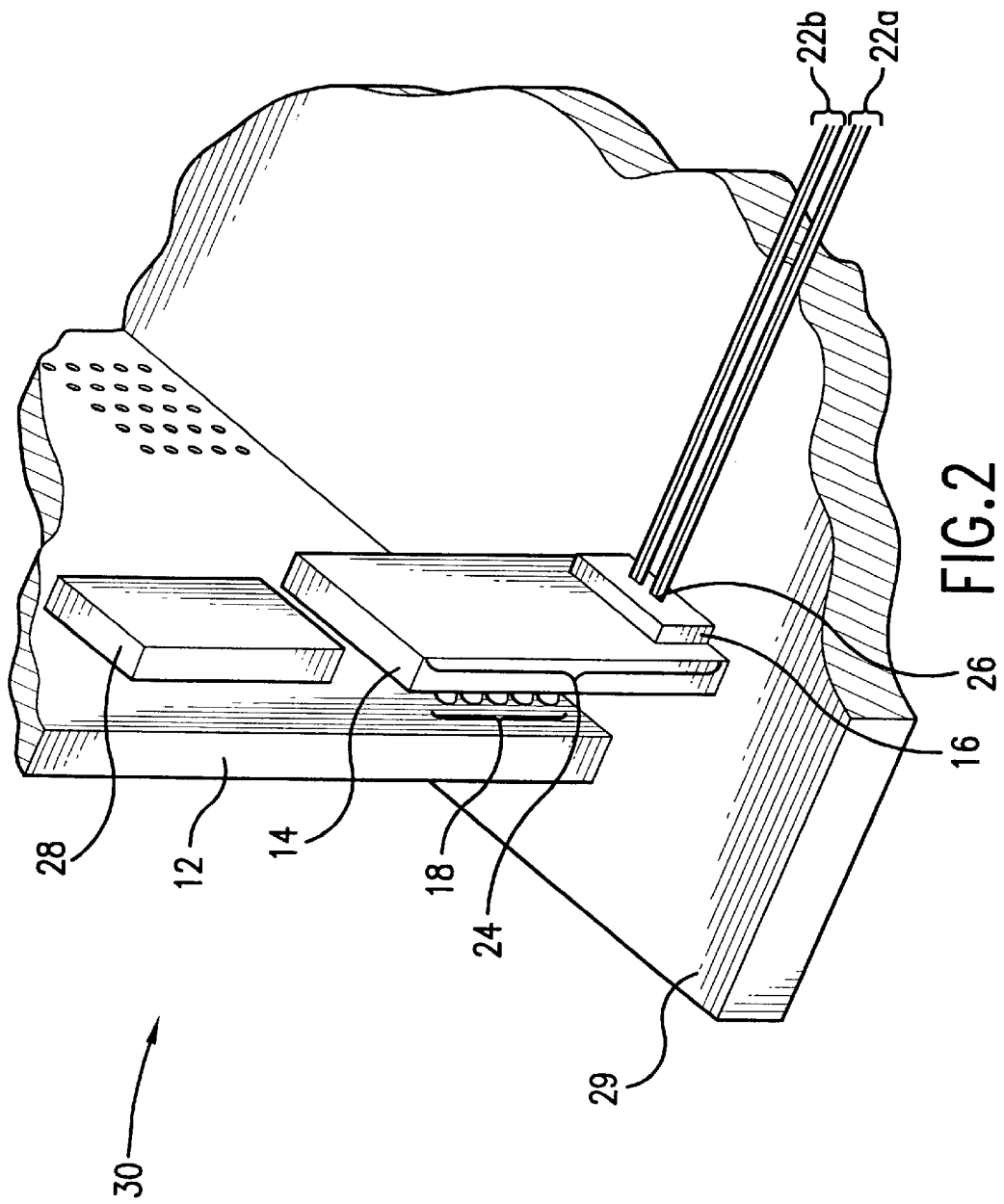
FIG. 2 is a pictorial representation of one embodiment of an electro-optical module.

Referring now to FIG. 2, a pictorial representation of an electro-optical connection 30 between a circuit board 12 and an optical fiber 22a, 22b is shown to include one embodiment of the electro-optical module 24.

Here, the circuit board 12 is functionally shown as a daughtercard. Here, the optical fiber is shown as an input/output fiber pair 22a, 22b however an optical fiber array can be substituted as well as any other desirable configuration of the optical fibers. Also shown is a backplane 29. The electro-optical module 24 is shown spaced from the daughtercard in a unmated position.

The electro-optical module 24 is shown to include a routing substrate 14 and an optical interface mounted on a front surface of the routing substrate 14. The optical fiber pair 22a, 22b is connected to the optical interface 16 by a semi-permanent optical connection 26. In this way, the electro-optical module 24 provides a means for launching into an optical fiber positioned perpendicular to the circuit board 12.

Figure 2B:
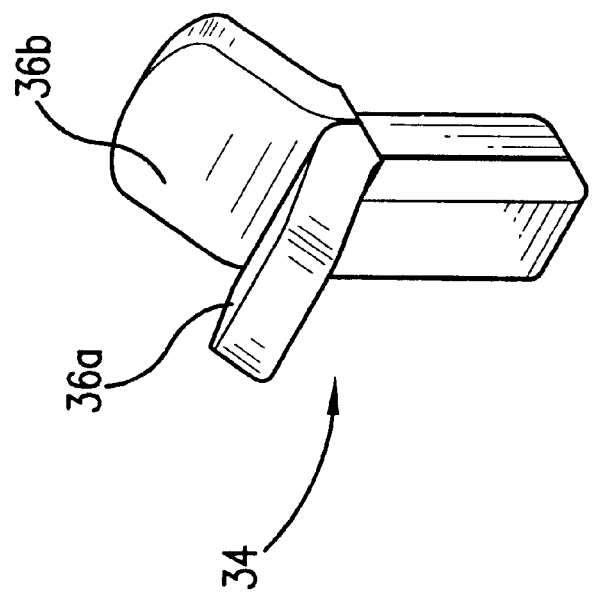
Figure 2A:
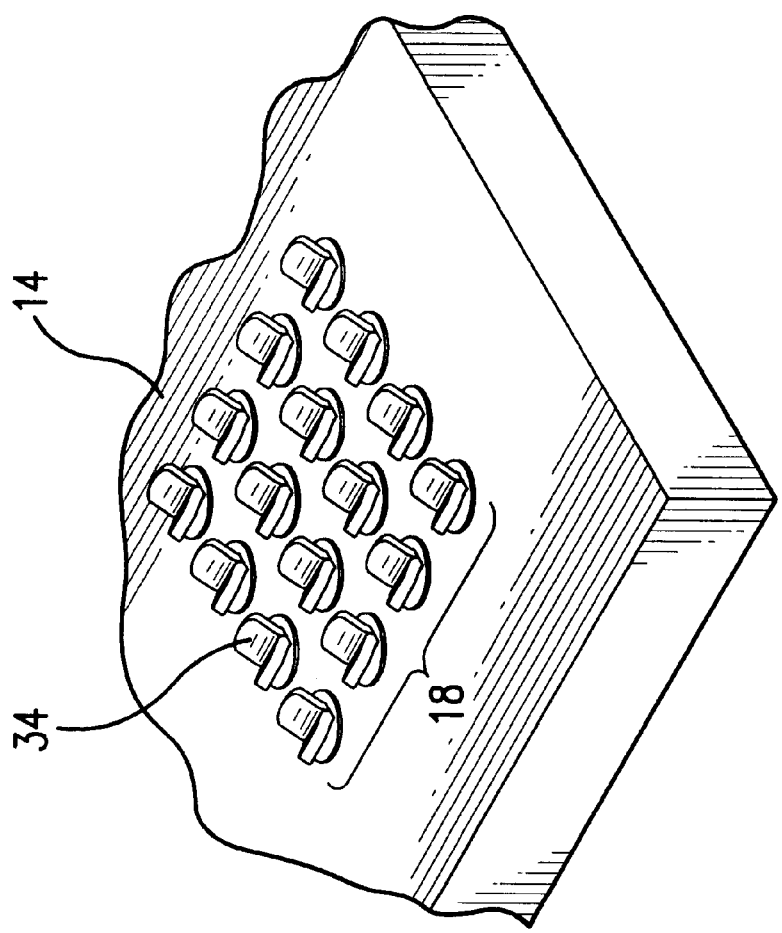

Referring also to FIG. 2A, the separable, electrical connection 18 is provided on a back surface of the routing substrate 14. The separable, electrical connection 18 is preferably provided by a z-axis, pressure mount connector. Here, the separable, electrical connection 18 is shown as an array of self-retained pressure connectors 34 located on the back surface of the routing substrate 14. These pressure connectors 34, an exemplary one shown in FIG. 2B, are small metallic structures which are pressed into plated through holes (not shown) in the routing substrate 14. Surface contacts 36a, 36b (FIG. 2B) contact pads (not shown) on the surface of circuit board 12. These multiple contact surfaces 36a, 36b provide multiple points of contact with the circuit board 12 surface pads thus providing a reliable electrical contact.

One benefit of using these small pressure connectors 34 is that small contact pads can be used on the circuit board surface and further, small plated through holes or vias can be used on the routing substrate 14. The small dimensions of these features allow for the separable, electrical connection 18 between the circuit board 12 and the routing substrate 14 to be optimized for low electrical parasitics.

In an alternate embodiment, a so-called mezzanine or stacking connector configured to provide the desired electrical signal properties can be used as the separable, electrical connection 18 between the circuit board 12 and the routing substrate 14. These connectors typically provide an electrical connection between two parallel circuit board surfaces.

Referring back to FIG. 2, the optical interface 16 includes an optical transceiver (not shown) and an optical/mechanical connection between the optical transceiver and optical fiber pair 22a, 22b. Typically, the optical transceiver responds to an analog signal rather than a digital signal as is typically communicated through a circuit board. Here, to provide and/or interpret the analog signal, driver electronics 28 for the optical transceiver are mounted on the circuit board 12. Typically, these driver electronics 28 are digital to analog converters packaged in an Application Specific Integrated Circuit (ASIC). The driver electronics 28 convert a digital signal being passed through the signal trace on the circuit board 12 to an analog current which drives the optical transceiver and vice versa.

The mechanical connection between the optical fibers and the optical transceiver can generally be done in a controlled factory setting. Alignment of the fibers to the optical transceiver performed in a dust free environment eliminates contamination at the end of the fiber, thus minimizing optical losses. A permanent connection can be provided between the optical fibers and the optical transceiver or a semi-permanent optical connection 26 as described in conjunction with FIG. 1.

In a preferred embodiment, the optical transceiver is an array of VCSEL elements. A VCSEL converts between an analog electrical signal and an optical signal. In an alternate embodiment, other opto-electrical (O/E) sources may be used in conjunction with photo detectors to provide the optical transceiver component of the optical interface 16.

Figure 3:
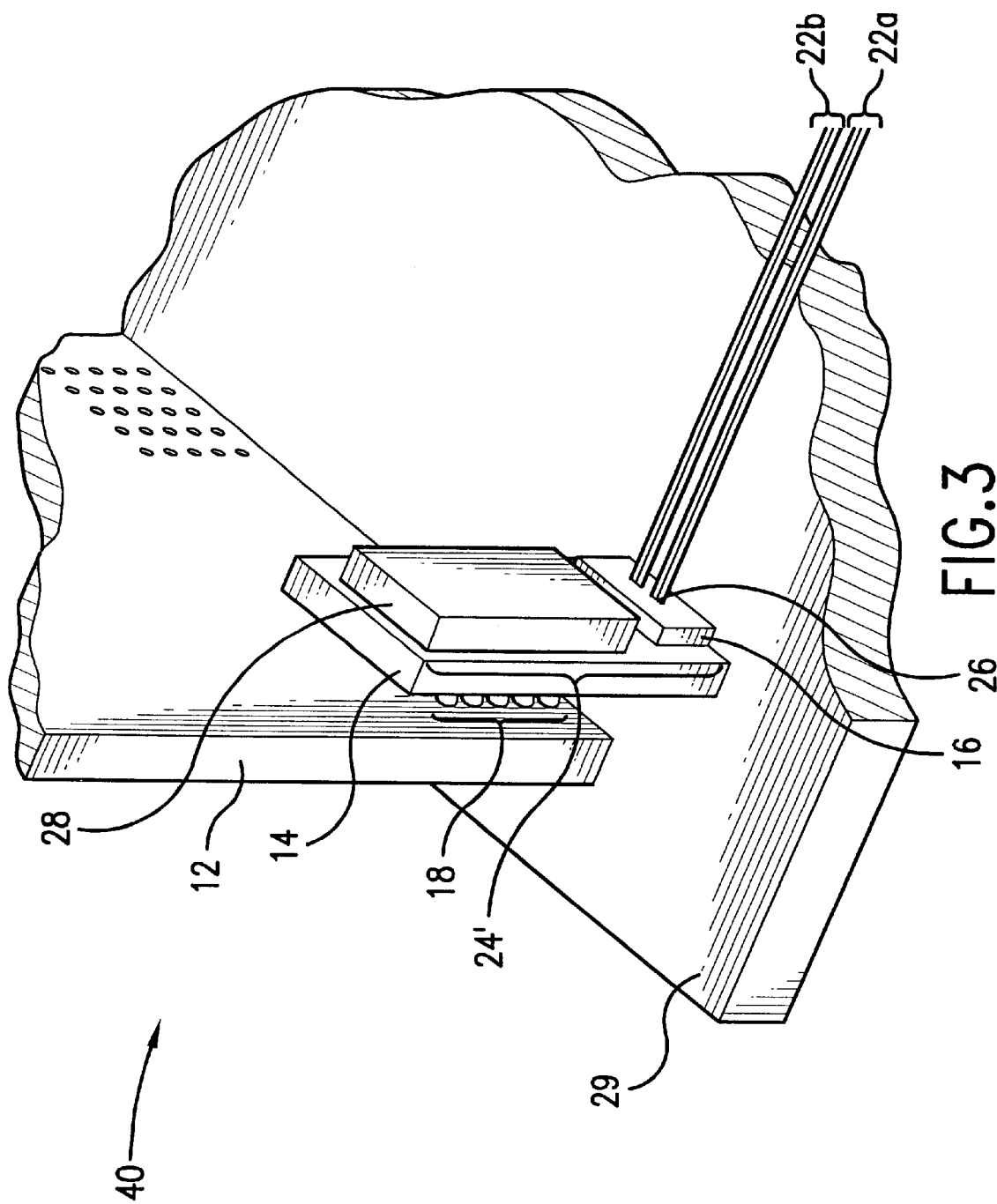
FIG. 3 is a pictorial representation of an alternate embodiment of the electro-optical module.

Referring now to FIG. 3, a pictorial representation of an electro-optical connection 40 between a circuit board 12 and an optical fiber is shown to include an alternate embodiment of the electro-optical module 24'.

The electro-optical module 24' includes a routing substrate 14. Mounted on a back surface of the routing substrate is a separable, electrical connection 18. An optical interface 16 is mounted on the front surface of the routing substrate with the optical fiber pair 22a, 22b being connected to the optical interface 16 by a semi-permanent optical connection 26.

Here, further included in the electro-optical module 24' are the driver electronics 28 for the optical source/driver which are mounted on the routing substrate 14. Mounting the driver electronics 28 on the routing substrate 14 frees up additional space on the daughtercard. In addition, it eases the transmission of the analog signals from the driver electronics to the optical source/driver.

In an alternate embodiment (not shown) the optical interface 16 can be mounted on the driver electronics 28 rather than on the routing substrate 14.

Figure 4:
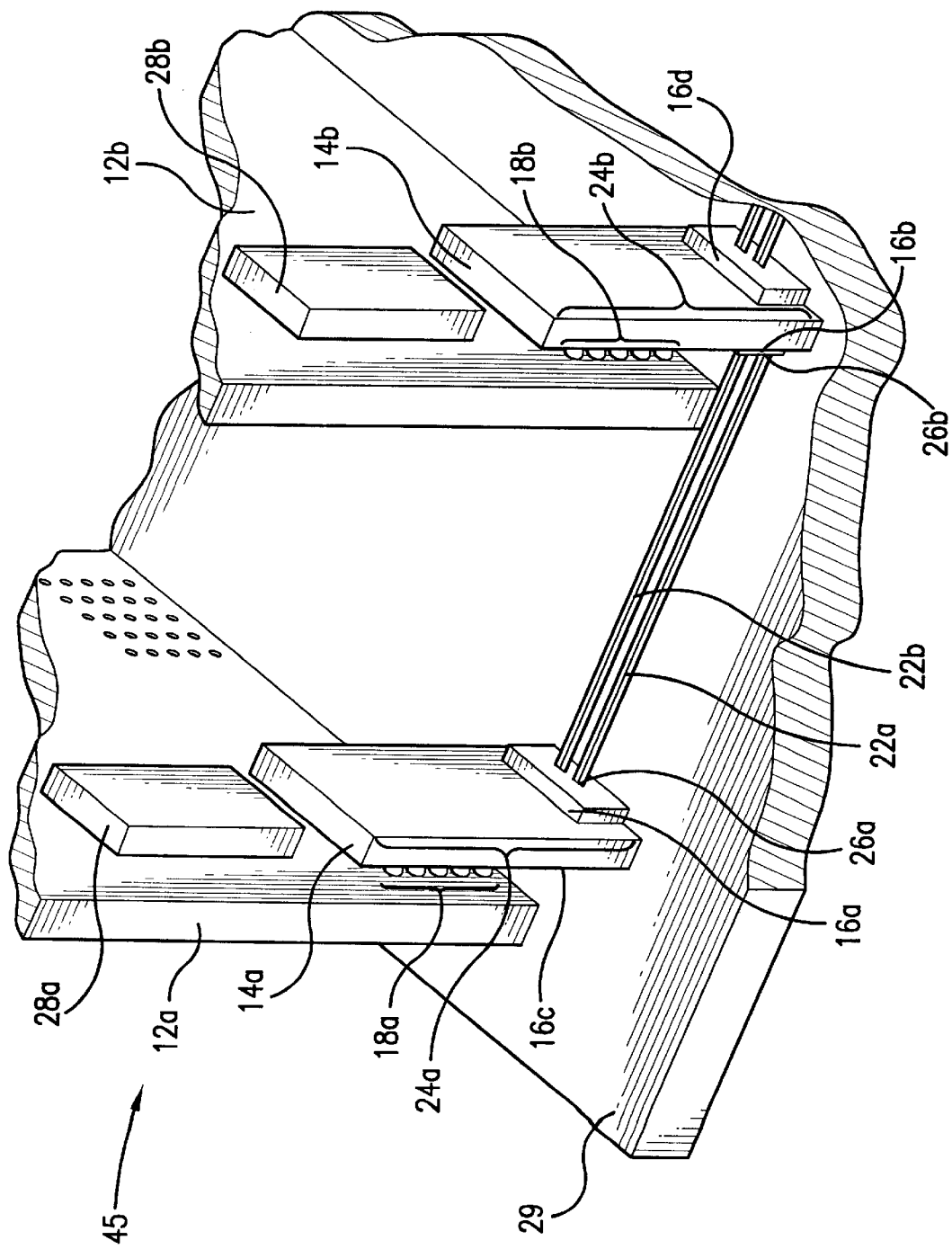
FIG. 4 is a pictorial representation of an electro-optical connection system.

Referring now to FIG. 4, a pictorial representation of an electro-optical connection system 45 that provides an electro-optical connection between a first circuit board 12a and a second circuit board 12b is shown. Here, the electro-optical connection system 45 is shown to include two electro-optical modules 24a, 24b.

Included in the first electro-optical module 24a is a first routing substrate 14a. Mounted on the routing substrate 14a is a first optical interface 16a located on a front surface and a second optical interface 16c located on a lower back surface. Optical interfaces 16a, 16c are provided on either side of the routing substrate 14a to enable the first circuit board 12 to communicate with circuit boards located on either side of the first circuit board 12 without requiring a bend in the optical fiber.

The first routing substrate 14a also includes a separable, electrical connection 18a provided on an upper back surface of the routing substrate 14a. Here, the separable, electrical connection 18a is shown as an array of self retained pressure connectors. The separable, electrical connection 18a provides electrical contact between the electro-optical module 24a and the first circuit board 12a. The optical fiber pair 22a, 22b is connected to the optical interface 16a by a semi-permanent optical connection 26a. Mounted on the circuit board 12a are the driver electronics 28a for an optical transceiver included in the optical interface 16a.

The second optical interface 16b is connected at a distal end of the optical fiber pair 22a, 22b by a second semi-permanent optical connection 26b. A third optical interface 16b is mounted on a front surface of a second routing substrate 14b. A fourth optical interface 16d is mounted on a lower back surface of the second routing substrate 14b to enable the second circuit board 12b to communicate with another circuit board located on its other side. The second routing substrate 14b connects to the second circuit board 12b through a separable, electrical interface 18b, also shown as an array of self retained pressure connectors, provided on an upper back surface of the routing substrate 14b. Mounted on the surface of the second circuit board 12b are the driver electronics 28b for an optical transceiver included in the optical interface 16b.

In an alternate embodiment, the driver electronics 28a, 28b are mounted on their respective routing substrates 14a, 14b rather than on the circuit boards 12a, 12b.

The electro-optical connection system 45 described above provides a solution to many of the problems faced by current electro-optical connection systems. Multiple mating cycles of traditional optical connectors degrade the performance of the connection and introduce, over time, additional signal losses into the system as guidance features aiding in the alignment between the two mating surfaces become worn. In addition, dirt and dust can become an increased contamination problem unless strict cleaning procedures are adhered to and even then, may still compound over time. Here, the wear and tear of multiple mate cycles are born by a separable, electrical connection 18 less susceptible to alignment issues and dirt and dust contamination. This system further eliminates the need to bend optical fibers perpendicularly to route them between daughtercards or adjacent backplanes thus eliminating significant volume associated with bend radius.

Figure 5:
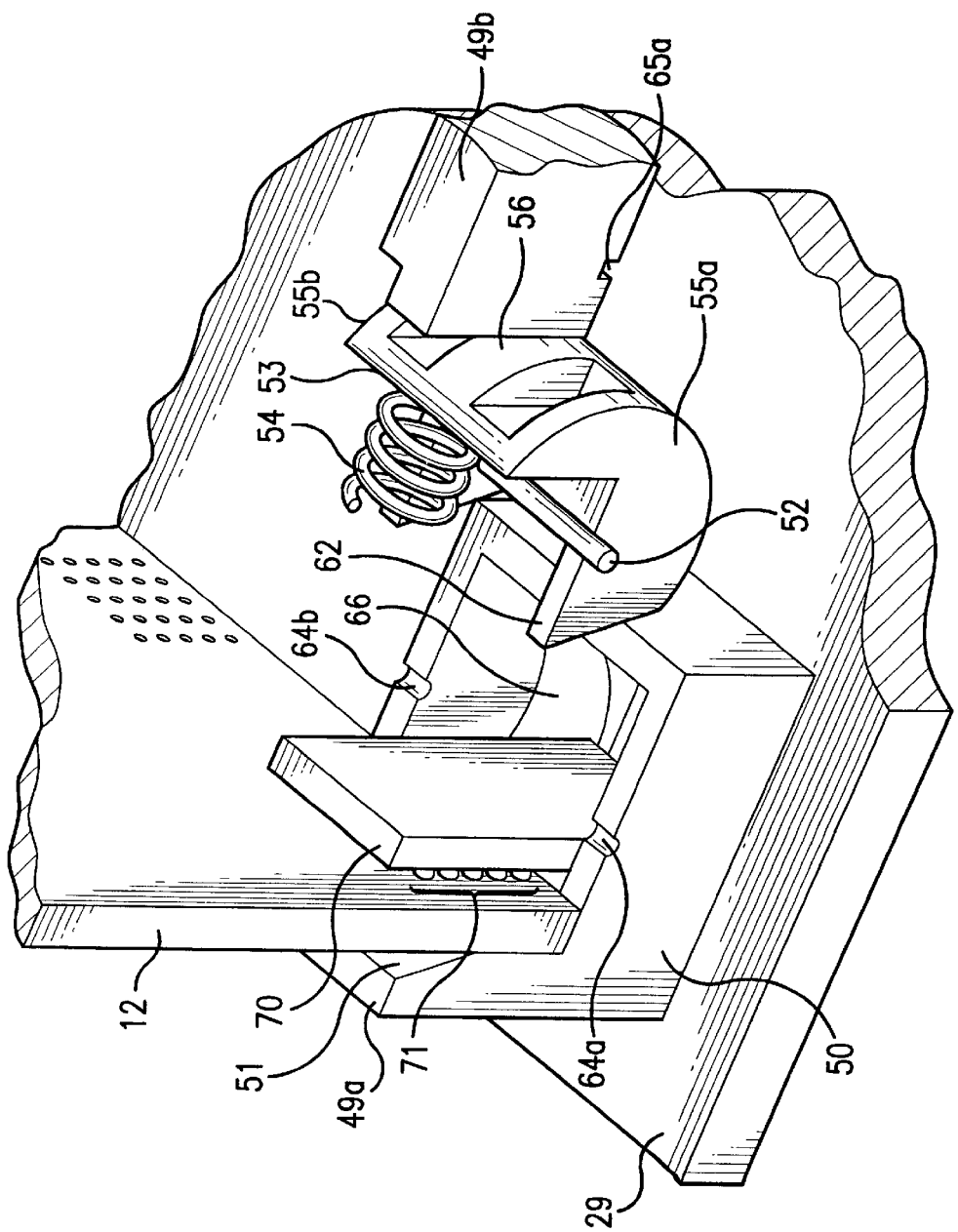
FIG. 5 is an exploded view of a general purpose z-axis pressure mount connector fixture.

Referring now to FIG. 5, an exploded view of a general purpose, z-axis pressure mount connector fixture 75 is shown to include a circuit board receiving slot 51, an actuator 56, and a loading spring 54. The circuit board 12 engages an activation surface 62 when inserted into the receiving slot 51, causing the actuator to pivot around a pivot pin 52 included on the actuator 56. The pivoting action presses a face 53 against the loading spring 54, compressing the spring 54 thus, applying a perpendicular force against a first surface of a mezzanine board or daughtercard 70.

The perpendicular force applied by the loading spring 54 presses an opposing face of the mezzanine board 70 against a surface of the circuit board 12 thus engaging a z-axis pressure connector 71 with a corresponding mating surface.

For example, in one embodiment, the z-axis pressure connector 71 is an array of self-retained pressure connectors 34 (FIG. 2A). The corresponding mating surface is an array of pads located on the surface of the circuit board 12. The perpendicular force flattens the contact surfaces 36a, 36b (FIG. 2A) of each self-retained pressure connector 34 against a corresponding pad on the circuit board 12 thus providing an electrical connection between the mezzanine board 70 and the circuit board 12.

Figure 6:
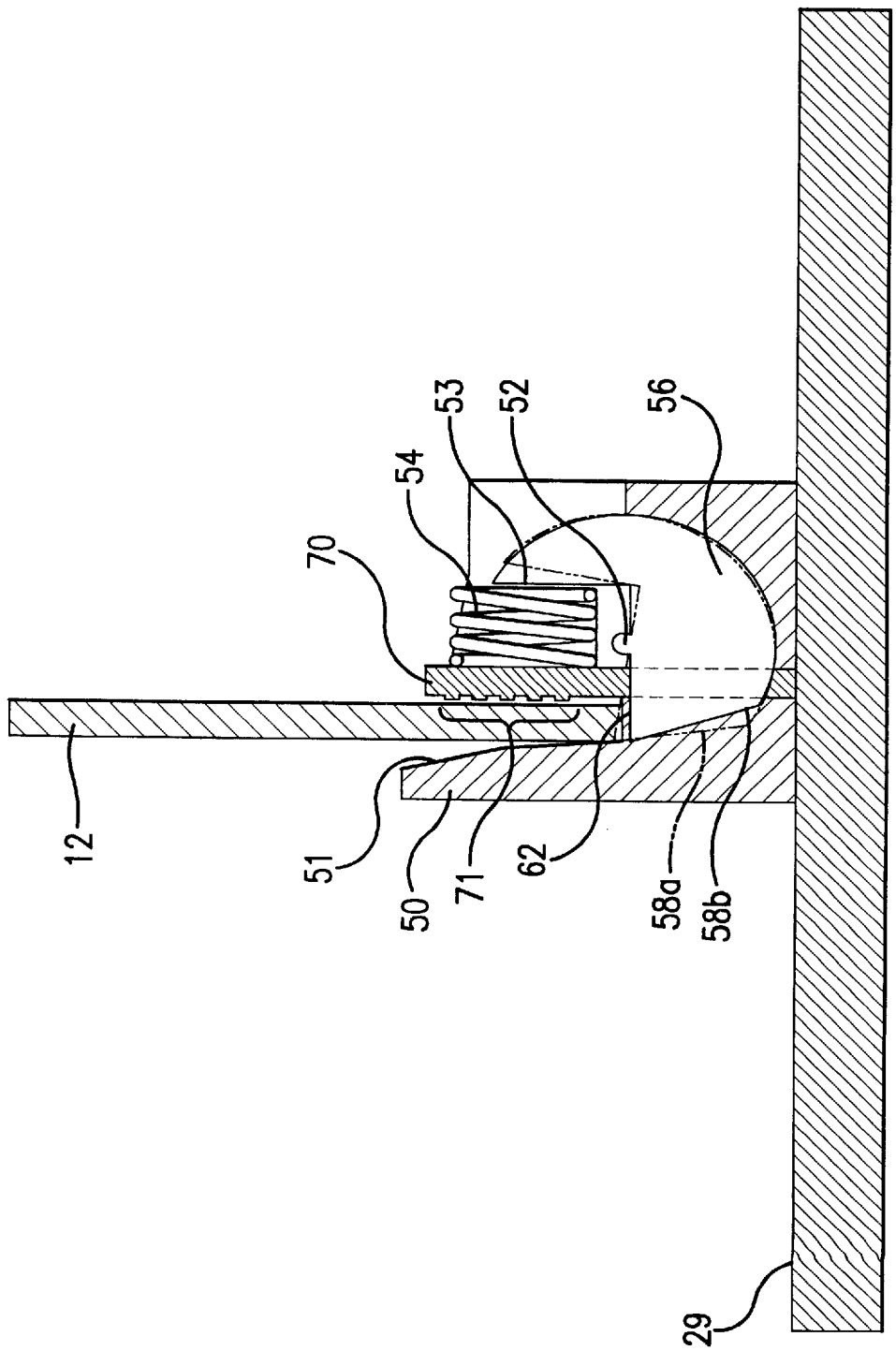
FIG. 6 is a cross-sectional view of the connector fixture of FIG. 5

Referring now to FIG. 6, a cross-sectional view of the connector fixture 75 illustrates a preloaded position 58a of the actuator 56. Prior to insertion of the circuit board 12, the actuator 56 is in the preloaded position 58a. When the circuit board 12 is inserted into the slot 51 in the connector fixture, the circuit board 12 engages the actuator 56 causing the actuator 56 to rotate. The actuator 56 rotates around the pivot pin 52 until it locks into its loaded position 58b. In the loaded position 58b, a face 53 of the actuator 56 compresses the loading spring 54, thus applying a perpendicular force against the mezzanine board 70. The perpendicular force caused by the loading spring 54 causes the array of z-axis pressure connectors 71 to mate with a corresponding mating surface (not shown) on the circuit board 12.

Figure 7:
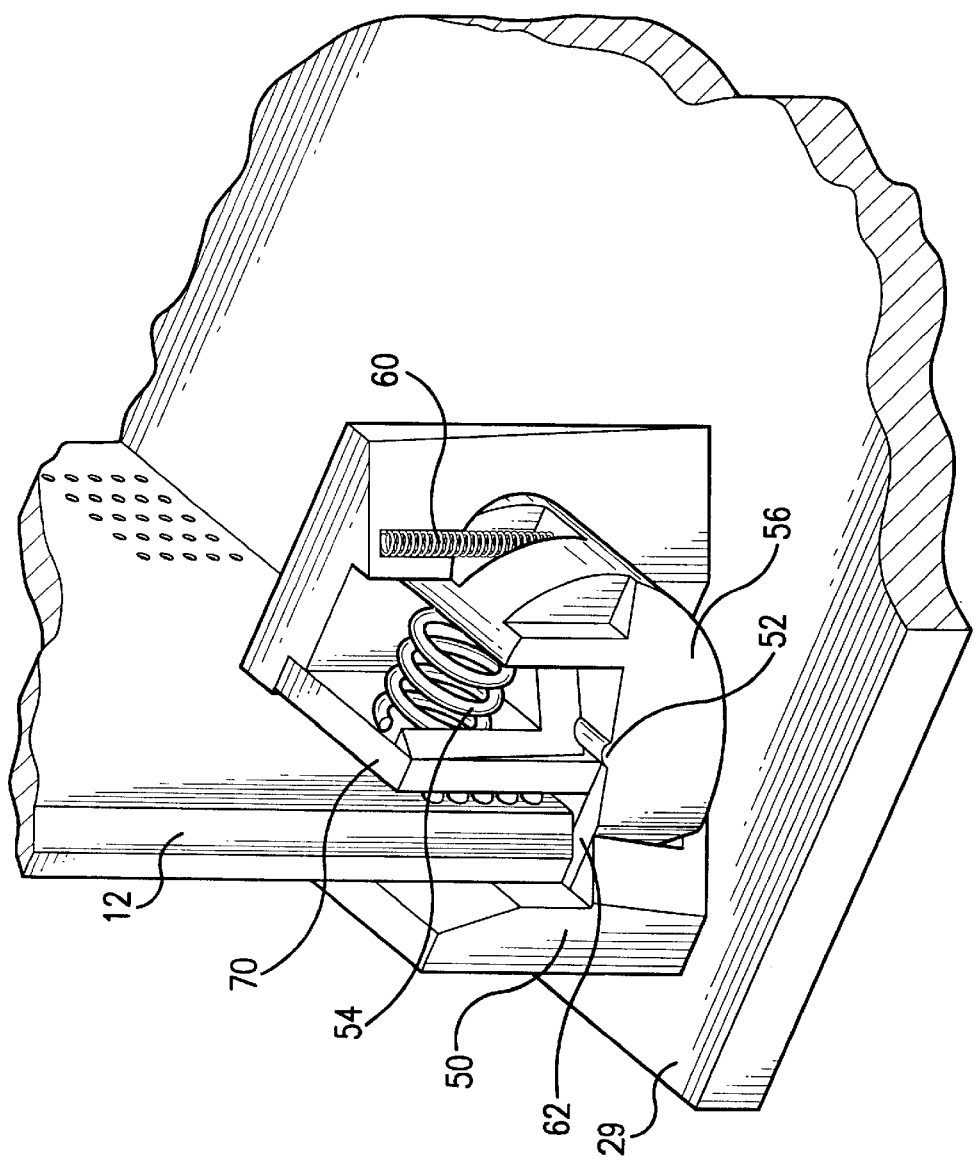
FIG. 7 is a cut-away view of the connector fixture of FIG. 6.

Referring now to FIG. 7, a cut-away view of the connector fixture 50 exposes an actuator retract spring 60. The actuator retract spring 60 aids in rotating the actuator 56 back to its preloaded position 58a when the circuit board 12 is removed. Specifically, when the circuit board 12 is removed from the slot 51, the actuator retract spring 60 exerts a force against the actuator 56 causing it to rotate in a clockwise direction until it comes to rest in its preloaded position 58a (FIG. 6).

Figure 8:
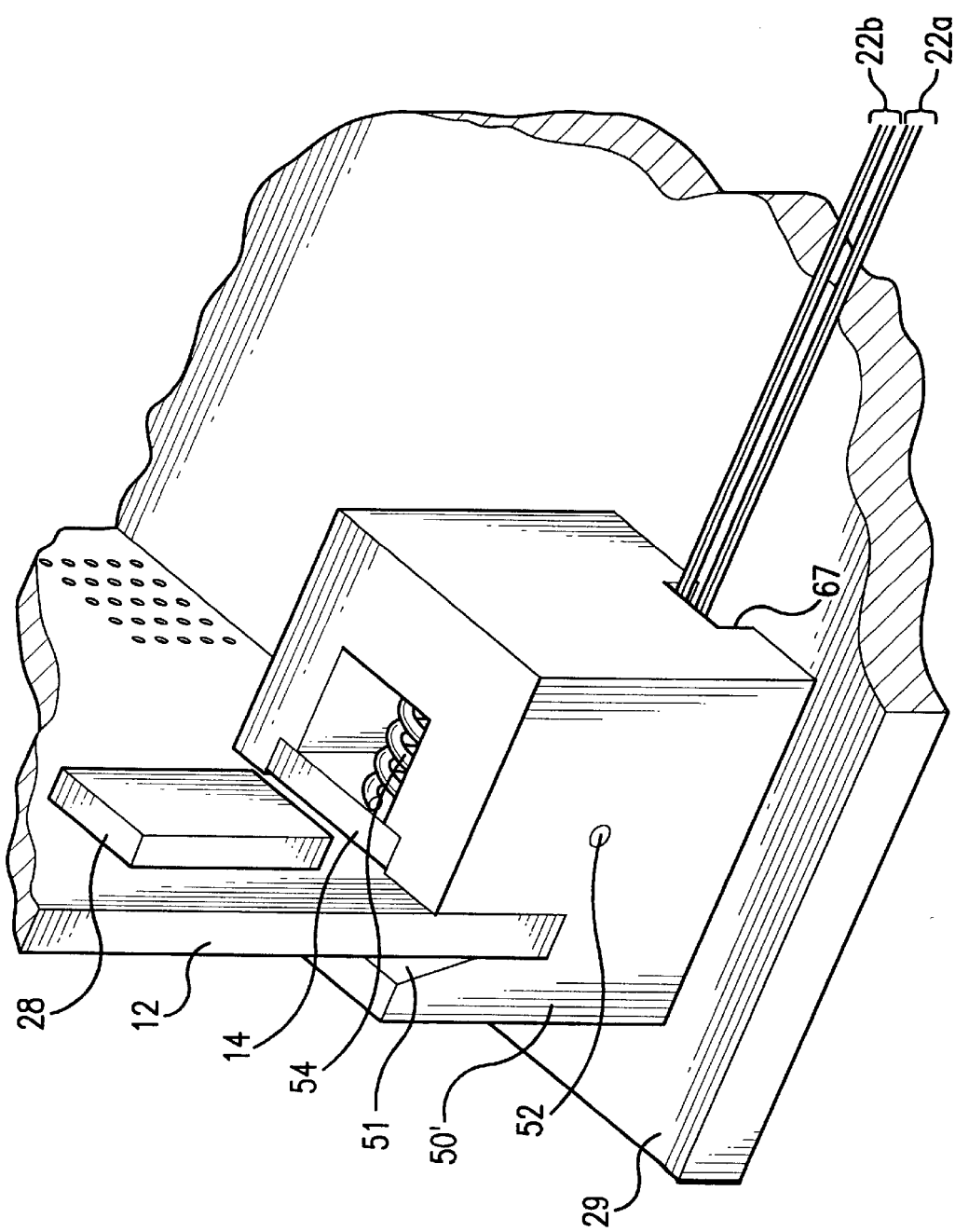
FIG. 8 is a pictorial representation of an alternate embodiment of a connector fixture used to mate the electro-optical module with a circuit board.

Referring now to FIG. 8, a pictorial representation of an alternate embodiment of a connector fixture 50' used to mate the electro-optical module 24 with the circuit board 12 is shown. The connector fixture 50' is shown to include a channel 67 through which the optical fiber pair 22a, 22b passes. The circuit board 12 is inserted into slot 51 in the connector fixture 50'. Once inserted, the actuator 56 (FIG. 5) within the body of the connector fixture pivots around the pivot pin 52 causing the loading spring to exert a force against the routing substrate 14 which, in turn, presses the routing substrate 14 against the circuit board 12.

Figure 9:
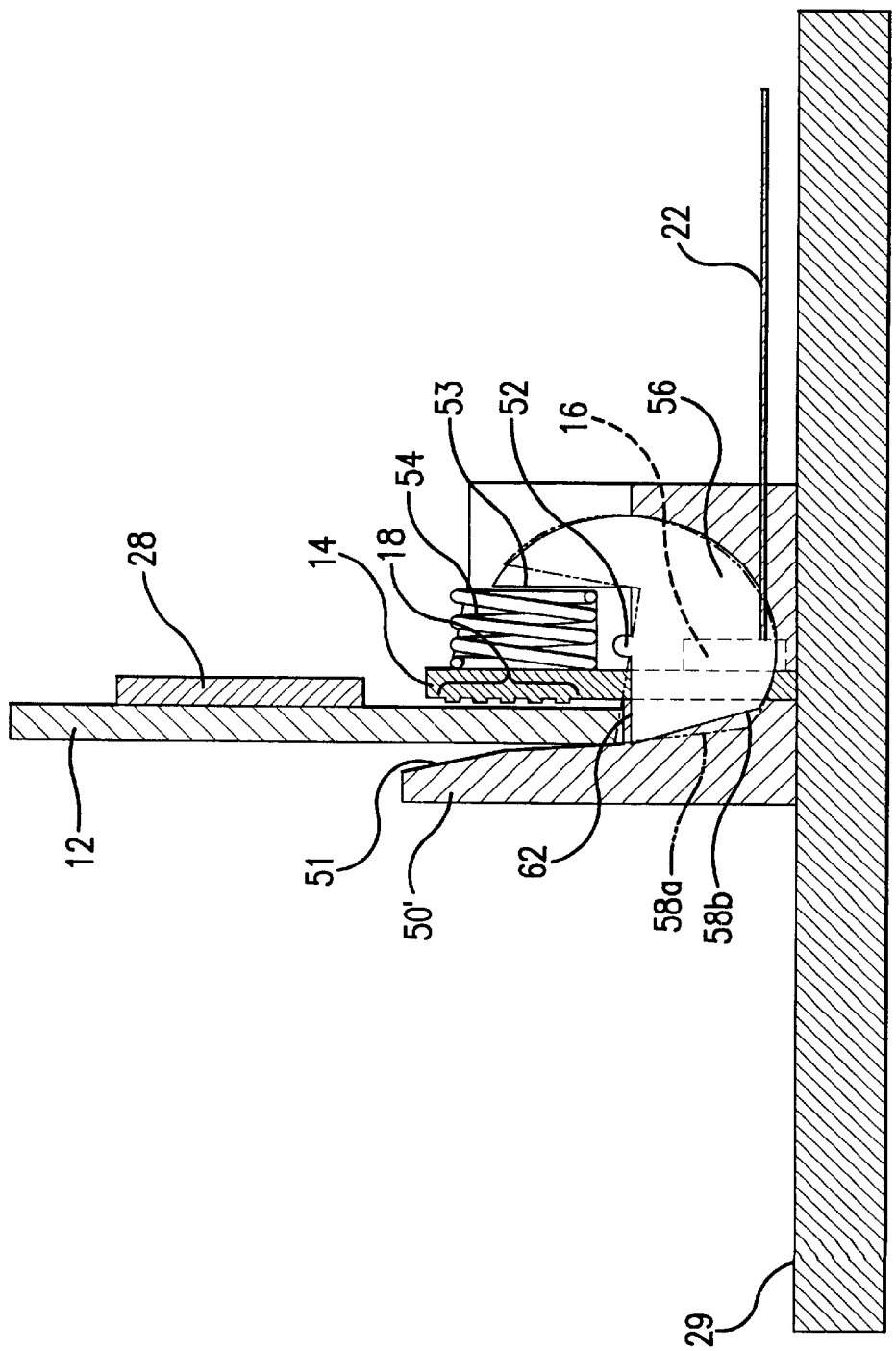
FIG. 9 is a cross-sectional view of the connector fixture of FIG. 7.

Referring now to FIG. 9, a cross-sectional view of the connector fixture 50' illustrates both a preloaded position 58a and a loaded position 58b of the actuator 56. Prior to insertion of the circuit board 12, the actuator 56 is in the preloaded position 58a. As the circuit board 12 is inserted into the slot 51 in the connector fixture, the circuit board 12 presses against an activation surface 62 on the actuator 56. The force against the activation surface 62 causes the actuator 56 to rotate, here, counter-clockwise around the pivot pin 52 until it locks into its loaded position 58b. In the loaded position 58b, a face 53 of the actuator 56 compresses the loading spring 54, thus applying a perpendicular force against the routing substrate 14. The perpendicular force caused by the loading spring 54 causes the array of self-retained pressure connectors 18 to mate with surface pads (not shown) on the circuit board 12.

Figure 10:
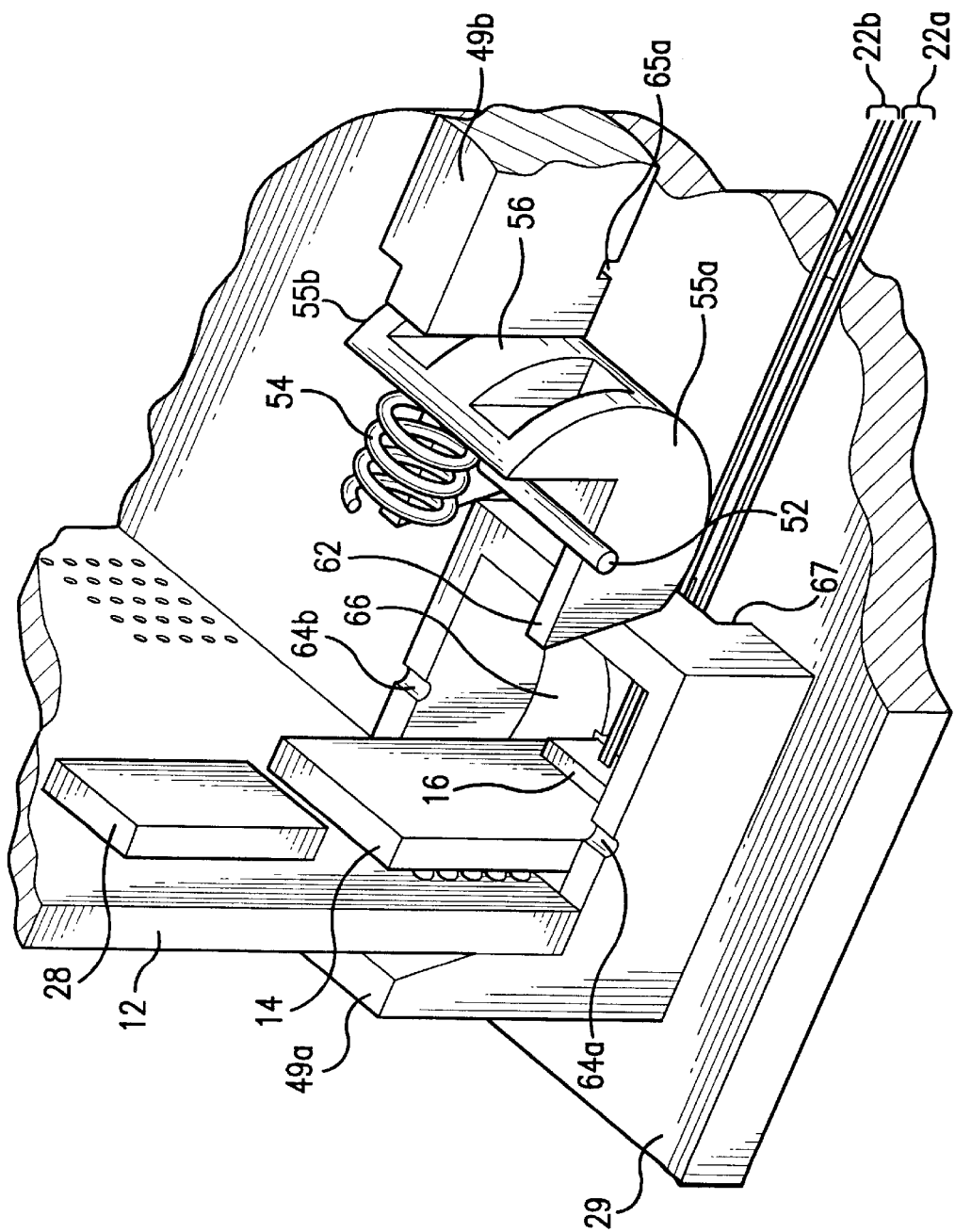
FIG. 10 is an exploded view of the connector fixture of FIG. 7 when used in conjunction with the electro-optical module of FIG. 2.
Figure 11:
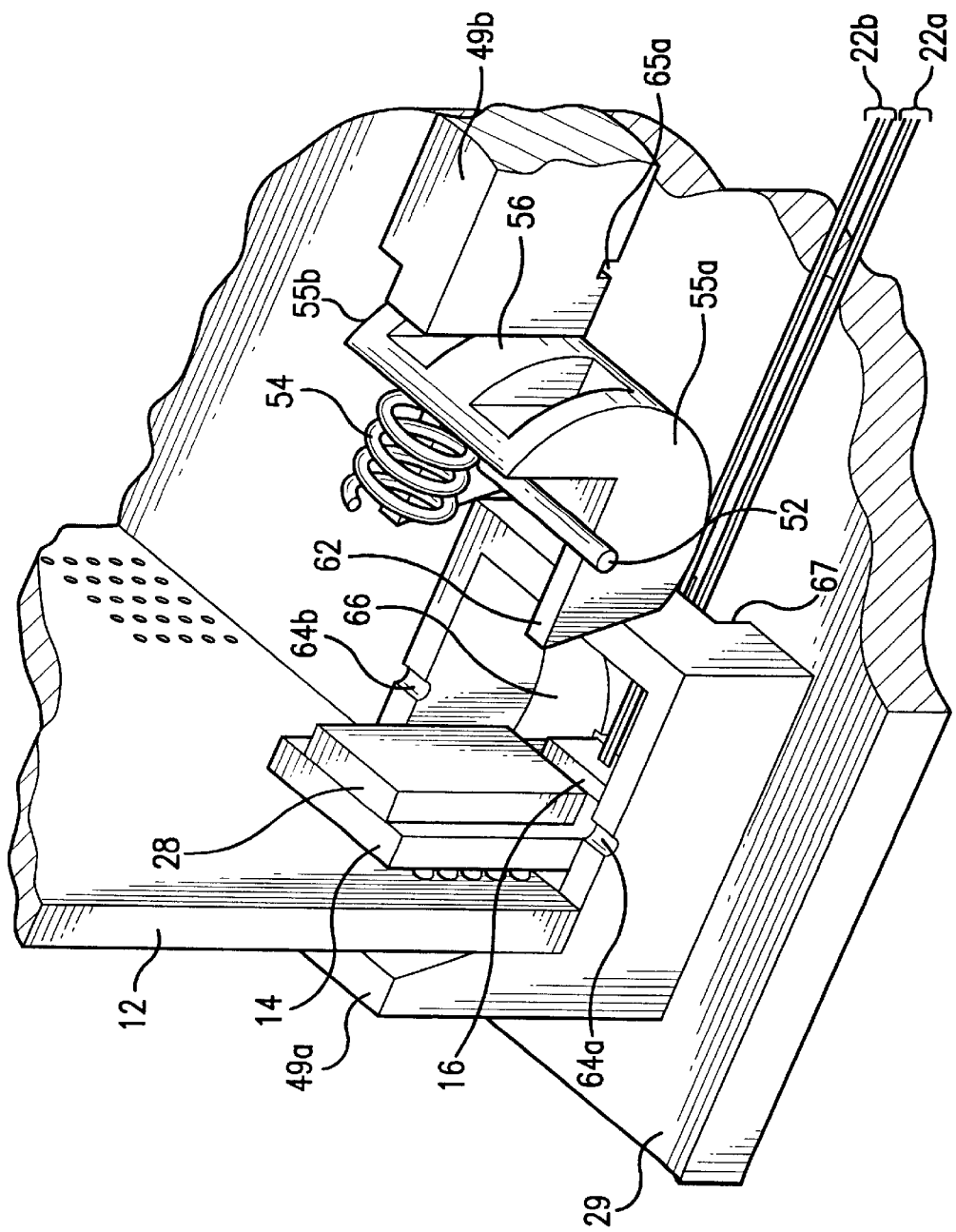
FIG. 11 is an exploded view of the connector fixture of FIG. 7 when used in conjunction with the electro-optical module of FIG. 3.

Referring now to FIGS. 10 and 11 exploded views of the connector fixture are shown when used in conjunction with the electro-optical module 24 of FIG. 2 (FIG. 10) and with the electro-optical module 24' of FIG. 3 (FIG. 11). In both FIGS. 10 and 11, the pivot pin 52 can be seen to extend across the length of the actuator 56 extending beyond each side face 55a, 55b of the actuator 56. These extended portions of the pivot pin 52 rest within grooves 64a, 64b in a bottom portion of the connector fixture body 49a. The top portion of the connector fixture body 49b includes a similar groove 65a, (65b is not visible). The actuator 56 then rotates within these grooves 64a, 64b 65a, 65b around the pivot pin 52. Also provided are wells 66 on each side of the bottom portion 49a of the connector fixture body to provide clearance for the actuator 56 as it rotates.

In the configuration of FIG. 10, the loading spring 54 presses against the routing substrate 14 when the actuator 56 is in the loaded position 58b (FIG. 8). In the configuration of FIG. 11 however, the loading spring 54 presses against the driver electronics package 28 when the actuator 56 is in the loaded position 58b (FIG. 8). An optional reinforcement plate (not shown) can also be used in conjunction with the loading spring 54 to protect the driver electronics package 28 from being damaged by the spring 54.

Figure 12:
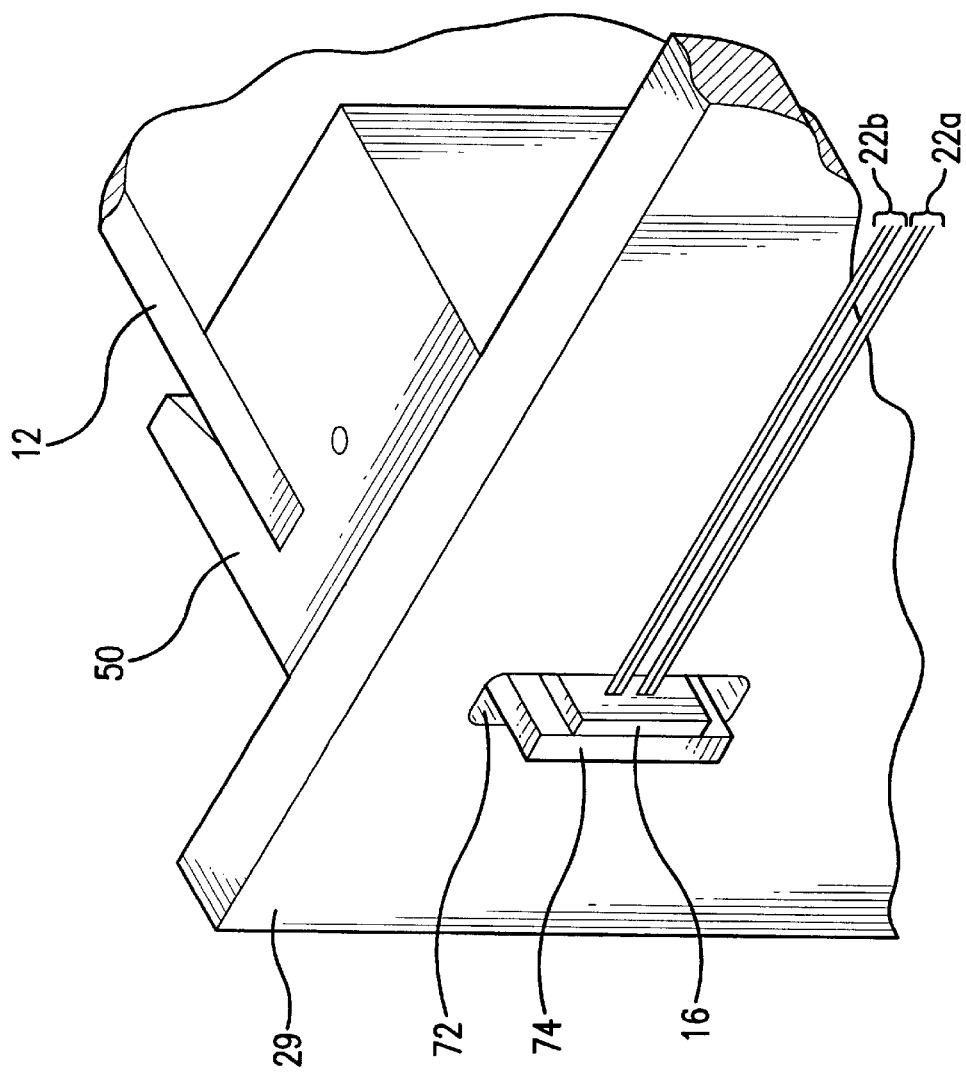
FIG. 12 is a pictorial representation of an alternate embodiment for routing the optical fibers.

Referring now to FIG. 12 a pictorial representation of an alternate embodiment for routing the optical fiber pair 22a, 22b is shown. Here, the backplane 29 includes a backplane cutout 72 through which a routing substrate 74 extends. The optical interface 16 is mounted on the substrate 74 however here, the optical fibers are routed on a back side of the backplane 29. This embodiment enables easy maintenance from the back side of the backplane 29 and greater flexibility in routing the optical fibers.

For example, using the backplane cutout 72 configuration, routing of optical fibers need not be limited between adjacent daughtercards but rather may be extended between daughtercards that are not adjacent as intermediate daughtercards would not be an obstacle to the routing. Typically, a "daughtercard connector void" is provided where the optical fibers pass by the daughtercard. A "daughtercard connector void" is a location on the daughtercard where no connector is located providing a space between the edge of the daughtercard and the surface of the backplane. It is through this space that the optical fiber passes.

Figure 13:
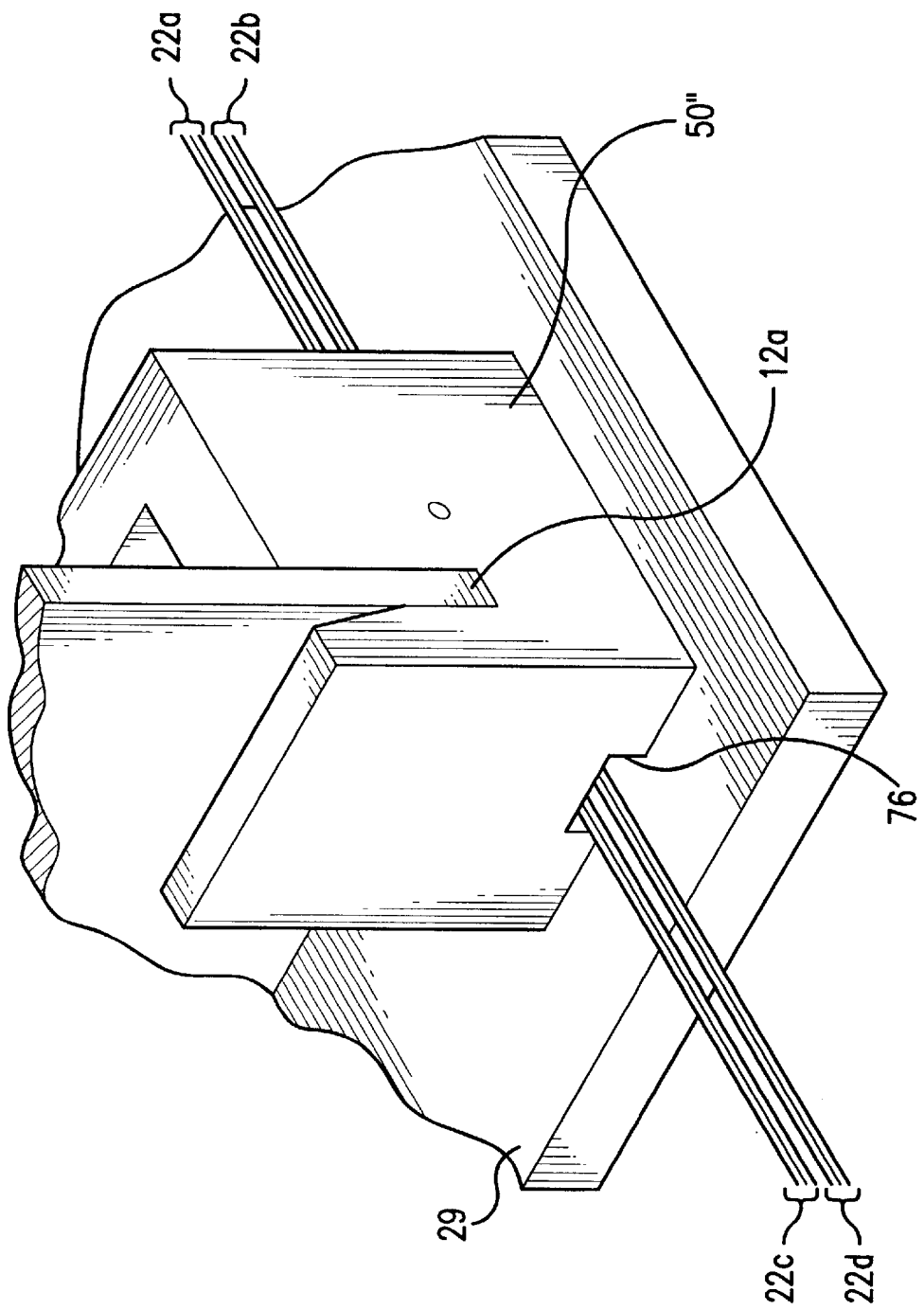
FIG. 13 is a pictorial representation of a connector fixture used in combination with the electro-optical module of FIG. 4.

Referring now to FIG. 13, a pictorial representation of a connector fixture 50" used in combination with the electro-optical module 24a (FIG. 4) is shown. The connector fixture 50" is shown to include a second channel 76 through which a second optical fiber pair 22c, 22d pass. The second optical fiber pair 22c, 22d are semi-permanently connected to a second optical interface 16c (FIG. 4) located on a lower back surface of the first routing substrate 14a (FIG. 4).

While this invention has been particularly shown and described with references to preferred embodiments thereof, it will be understood by those skilled in the art that various changes in form and details may be made therein without departing from the scope of the invention encompassed by the appended claims.

What is claimed is:

1. A connector fixture for enabling a z-axis, pressure mount connection, the connector fixture comprising:
   a slot;
   an actuator, responsive to engagement by a circuit board inserted into said slot; and
   a loading spring, responsive to rotation of said actuator, for compressing against a surface of a z-axis, pressure mount connector; and
   a retraction spring, responsive to removal of the circuit board from said slot.

2. The connector fixture of claim 1 further comprising:
   a channel for accepting an optical fiber.

3. A connector fixture for enabling an electro-optical connection, the connector fixture comprising:
   a slot;
   an actuator, responsive to engagement by a circuit board inserted into said slot;
   a channel for accepting an optical fiber; and
   a loading spring, responsive to rotation of said actuator, for compressing against a surface of the electro-optical connector.

4. The connector fixture of claim 3 further comprising:
   a retraction spring, responsive to removal of the circuit board from said slot.

5. An electro-optical connection system including a fixture according to claim 3, the electro-optical connection system further comprising an electro-optical module disposed between the loading spring and the slot, the electro-optical module having electrically conductive inputs facing the slot and an optical output facing the channel for accepting an optical fiber.

6. The electro-optical connection system of claim 5 additionally comprising a fiber affixed to the electro-optical module passing through the channel.

7. An electro-optical connection system comprising:
   a) a first circuit board and a second circuit board, each of the circuit board having a surface with electrical contact points thereon;
   b) a first fixture and a second fixture for receiving a respective one of the printed circuit boards, wherein each fixture comprises:
      i) an electro-optical module, the electro-optical module having an electrical interconnect and an optical interconnect;
      ii) a support for releasably holding the respective printed circuit board;
      iii) a movable member coupled to the electro-optical module, the movable member being movable toward and away from the support; and
      iii) a biasing mechanism, biasing the electrical interconnects of the electro-optical module into engagement with the respective printed circuit board;
   c) optical fiber between the fiber optic interconnect of the electro-optical module of the first fixture and the second fixture.

8. The electro-optical connection system of claim 7 wherein the biasing mechanism comprises a spring.

9. The electro-optical connection system of claim 7 wherein the movable member comprises a pivoting actuator.

10. The electro-optical connection system of claim 7 wherein the biasing mechanism is attached to the movable member.

11. The electro-optical connection system of claim 7 further comprising a substrate with an upper surface on which the first fixture and the second fixture are mounted and a lower surface, with the fiber optic interconnect running along the lower surface.

12. The electro-optical connection system of claim 7 wherein there is a pressure contact between the electrical contact points on the first and second printed circuit boards and the electrical interconnect of the respective electro-optical modules.

13. The electro-optical connection system of claim 7 wherein each electro-optical module includes a routing substrate and an optical interface.

14. The electro-optical connection system of claim 13 wherein the routing substrate includes pressure contacts thereon.

15. The electro-optical connection system of claim 7 wherein there is a separable interface between each electro-optical module and a respective printed circuit board.

16. The electro-optical connection system of claim 15 wherein there is a semi-permanent connection between each optical interconnect and the optical fiber.

17. The electro-optical connection system of claim 7 wherein the movable member rotates about a pivot point and the rotation is actuated by insertion of a printed circuit board into the respective fixture.

* * * * *